United States Patent
Okamoto et al.

(10) Patent No.: US 9,501,136 B2
(45) Date of Patent: Nov. 22, 2016

(54) INFORMATION PROCESSING DEVICE

(71) Applicant: Panasonic Intellectual Property Management Co., Ltd., Osaka-shi, Osaka (JP)

(72) Inventors: Ryuichi Okamoto, Osaka (JP); Masaki Mukai, Hyogo (JP); Tomoyuki Shimomura, Osaka (JP); Masaichi Yano, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 100 days.

(21) Appl. No.: 14/551,840

(22) Filed: Nov. 24, 2014

(65) Prior Publication Data

US 2015/0185805 A1 Jul. 2, 2015

(30) Foreign Application Priority Data

Dec. 27, 2013 (JP) .................................. 2013-271258
Sep. 1, 2014 (JP) .................................. 2014-176823

(51) Int. Cl.
G06F 1/32 (2006.01)

(52) U.S. Cl.
CPC ............. *G06F 1/329* (2013.01); *G06F 1/3209* (2013.01)

(58) Field of Classification Search
CPC ............................... G06F 1/3209; G06F 1/329
USPC .......................................................... 713/323
See application file for complete search history.

(56) References Cited

U.S. PATENT DOCUMENTS

| 8,433,375 B2 | 4/2013 | Yamazaki et al. | |
| 2006/0105713 A1 | 5/2006 | Zheng et al. | |
| 2010/0100642 A1 | 4/2010 | Zheng et al. | |
| 2011/0078627 A1 | 3/2011 | Zheng et al. | |
| 2012/0105887 A1* | 5/2012 | Osaki ................... | G06F 3/1219 358/1.13 |
| 2013/0125004 A1 | 5/2013 | Zheng et al. | |
| 2013/0198546 A1* | 8/2013 | Fujisawa ............... | G06F 1/3234 713/323 |
| 2013/0278958 A1 | 10/2013 | Kuwahara | |
| 2013/0326356 A9 | 12/2013 | Zheng et al. | |
| 2013/0341861 A1* | 12/2013 | Kanamoto .............. | B65H 7/20 271/288 |

FOREIGN PATENT DOCUMENTS

| JP | 2008-520164 | 6/2006 |
| JP | 2012-019499 | 1/2012 |
| JP | 2012-147099 | 8/2012 |
| WO | 2006/055127 | 5/2006 |

\* cited by examiner

*Primary Examiner* — Zahid Choudhury
(74) *Attorney, Agent, or Firm* — Hamre, Schumann, Mueller & Larson, P.C.

(57) ABSTRACT

A highly convenient information processing device is provided. The information processing device according to the present disclosure includes a communication unit, a storage unit in which an OS and a program are stored, and a processor configured to execute a predetermined program based on identification information of a predetermined network when the communication unit establishes a connection to the predetermined network. In a case where the communication unit establishes a connection to the predetermined network when the information processing device is in a sleep state, the processor does not execute the predetermined program, and after the sleep state is cleared, the processor executes the predetermined program.

2 Claims, 5 Drawing Sheets

400

| Identification information (410) | Priority order (420) | Environment setting information (430) | Program (441) | Attribute information (442) |
|---|---|---|---|---|
| Network A | 1 | IP address = obtain by DHCP | Program A | When sleep state is cleared |
| Network B | 2 | IP address =192.168.111.10 | Program B | Immediately after connection |
| Network C | 3 | IP address = obtain by DHCP | Program C | Immediately after connection |
| Network D | 4 | IP address = obtain by DHCP | Program D | Execute only once |
| ... | ... | ... | ... | ... |
| Network... | N | ... | ... | ... |

FIG. 4
400

| Identification information | Priority order | Environment setting information | Program | Attribute information |
|---|---|---|---|---|
| Network A | 1 | IP address = obtain by DHCP | Program A | When sleep state is cleared |
| Network B | 2 | IP address = 192.168.111.10 | Program B | Immediately after connection |
| Network C | 3 | IP address = obtain by DHCP | Program C | Immediately after connection |
| Network D | 4 | IP address = obtain by DHCP | Program D | Execute only once |
| Network... | N | ... | ... | ... |
| ... | | | | |

410 / 420 / 430 / 441 / 442

INFORMATION PROCESSING DEVICE

BACKGROUND OF THE INVENTION

1. Field of the Invention

The present disclosure relates to an information processing device having a network connecting function.

2. Description of the Related Art

PTL 1 discloses an information processing device that attempts to connect to a plurality of networks according to a priority order.

CITATION LIST

Patent Literature

PTL 1: Japanese Translation of PCT Publication No. 2008-520164

SUMMARY OF THE INVENTION

The present disclosure provides a highly convenient information processing device.

The information processing device according to the present disclosure includes a communication unit, a storage unit in which an OS and a program are stored, and a processor configured to execute a predetermined program based on identification information of the predetermined network when the communication unit establishes a connection to the predetermined network, wherein in a case where the communication unit establishes a connection to the predetermined network when the information processing device is in a sleep state, the processor does not execute the predetermined program, and after the sleep state is cleared, the processor executes the predetermined program.

The information processing device according to the present disclosure can appropriately control execution of a program, and thus is highly convenient.

BRIEF DESCRIPTION OF DRAWINGS

FIG. 4 is a diagram illustrating an example of a profile stored in a storage unit of the information processing device in the exemplary embodiment.

DETAILED DESCRIPTION OF THE PREFERRED EMBODIMENT

Hereinafter, an exemplary embodiment will be described in detail with reference to the drawings as appropriate. However, unnecessarily detailed description may occasionally be omitted. For example, detailed description of well-known matters and redundant description of substantially the same configurations may occasionally be omitted. This is to prevent the following description from being unnecessarily redundant to facilitate understanding of those skilled in the art.

The accompanying drawings and the following description are provided for those skilled in the art to fully understand the present disclosure. These are not intended to limit a subject described in the claims.

Exemplary Embodiment

Hereinafter, an exemplary embodiment will be described with reference to FIGS. 1 to 5.
[1-1-1. Configuration of System]

Figure 1:
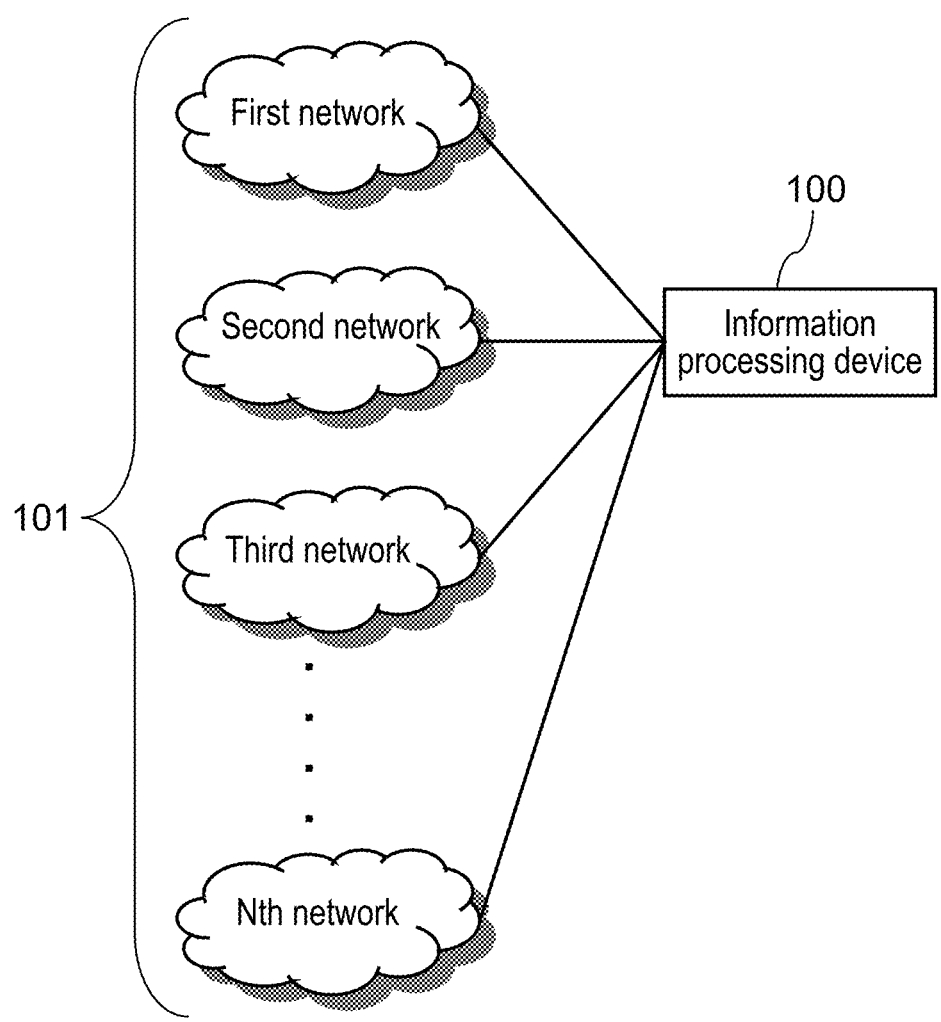
FIG. 1 is a diagram illustrating an environment in which an information processing device in an exemplary embodiment operates.

FIG. 1 is a diagram illustrating an environment in which information processing device 100 in the exemplary embodiment operates. In FIG. 1, information processing device 100 performs an operation in an environment where one or more networks 101 exist.

Networks 101 are networks to which information processing device 100 can connect. Networks 101 include various known networks. For example, networks 101 include a WWAN (Wireless Wide Area Network) that is a communication service for connection to a wide area data communication network by wireless communication, a WLAN (Wireless Local Area Network/Wireless LAN) that is a local area communication network for performing transmission and reception of data wirelessly, a WiMAX (registered trademark) (Worldwide Interoperability for Microwave Access) network that is one of the standards of wireless communication technology, and a wired LAN (Local Area Network) that is a local area communication network in which devices are connected with communication cables such as copper wires or optical fibers for performing communication by transmission and reception of electricity or light.

[1-1-2. Configuration of Information Processing Device]

Figure 2:
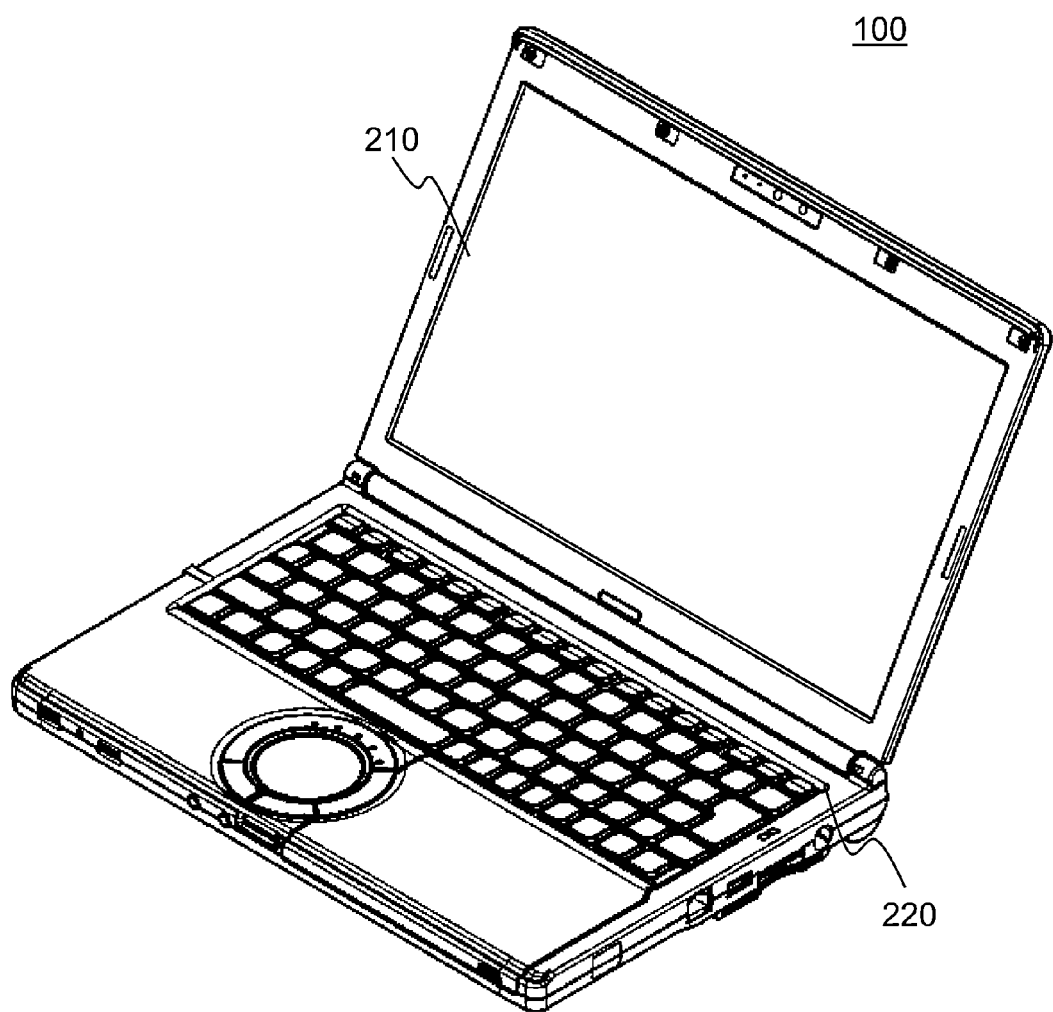
FIG. 2 is an external view of the information processing device in the exemplary embodiment.

FIG. 2 is an external diagram of information processing device 100 in the exemplary embodiment.

Information processing device 100 performs predetermined information processing based on an OS (Operating System). In this exemplary embodiment, a notebook computer is used as an example of information processing device 100 for description.

Information processing device 100 according to the present disclosure is not limited to a notebook computer. As information processing device 100, the present disclosure may be applicable to a laptop PC, a tablet PC, a smartphone, a wearable computer, or the like.

Output unit 210 displays an image or video. A liquid crystal display is typically used for output unit 210.

Input unit 220 receives an input. A touch panel, a keyboard, a touch pad, buttons, and the like are typically used for input unit 220.

Figure 3:
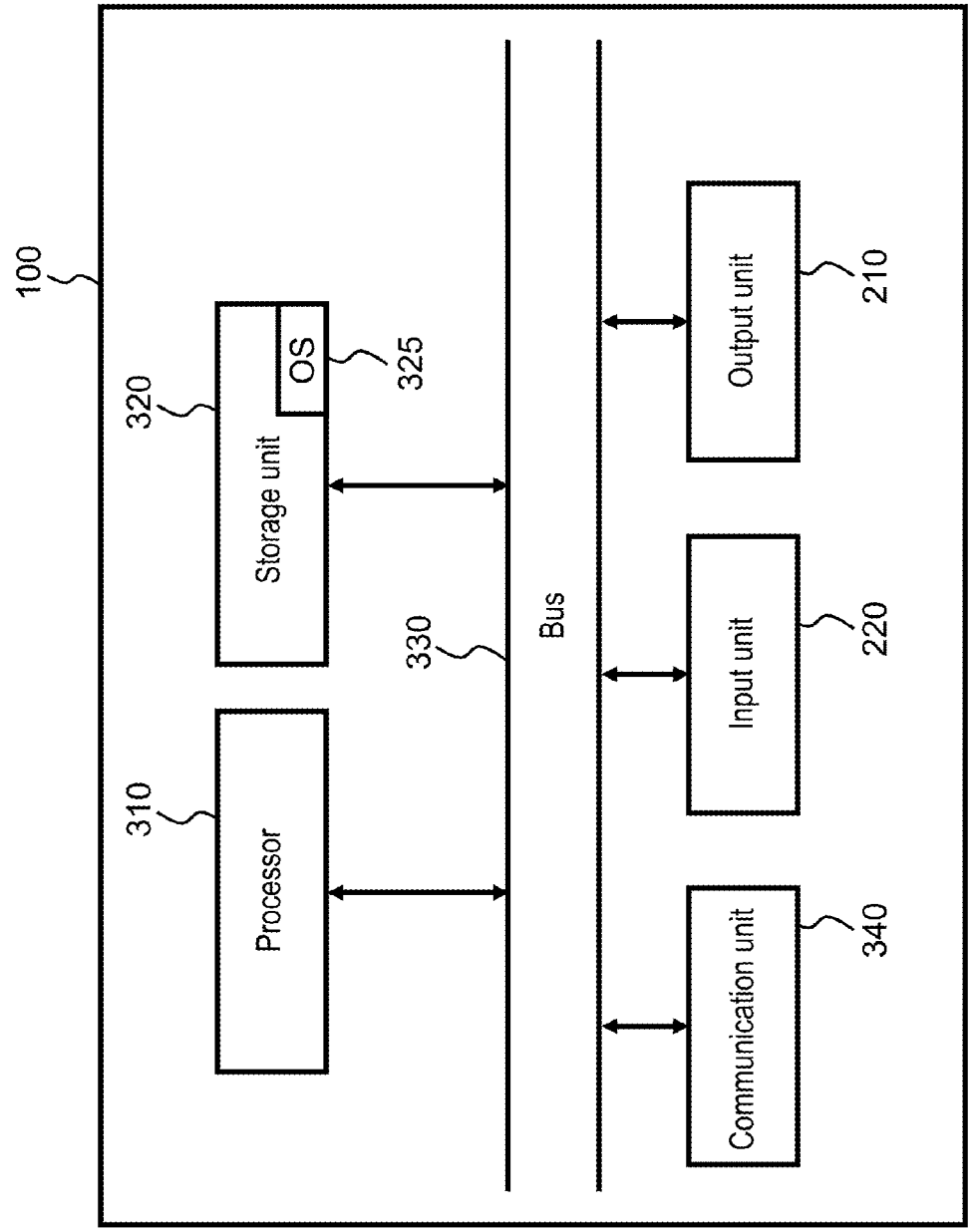
FIG. 3 is a block diagram of the information processing device in the exemplary embodiment.

FIG. 3 is a block diagram of information processing device 100 in the exemplary embodiment.

Processor 310 executes a program to control other components of information processing device 100. For example, processor 310 controls communication unit 340 to perform connection to networks 101.

Storage unit 320 temporarily or permanently stores data necessary for processing by information processing device 100. For example, OS 325, a program, a profile to be described below, or the like are stored in storage unit 320. A volatile memory, a non-volatile memory, or a HDD (Hard Disk Drive) is used for storage unit 320.

OS 325 is software for managing operation of information processing device 100. In this exemplary embodiment, OS 325 causes OS 325 itself to transition between at least two states, a sleep state and a non-sleep state. For example, when input unit 220 has not received an input from a user for a while, OS 325 causes itself to transition to the sleep state. The sleep state is a state to which OS 325 itself transitions, anticipating that use of information processing device 100 will be suspended, or a state to which OS 325 transitions under an instruction from the user of information processing device 100. The sleep state is a state in which operation of information processing device 100 is temporarily suspended and information processing device 100 is put on standby in a power-saving mode, and includes a hibernation state in which contents of a memory are stored in a hard disk and power is turned off, a standby state in which power supply to a hard disk or the like is stopped while a memory is left in operation for setting to a power-saving mode, and a screen-off state in which display of input unit 220 is stopped. Information indicating whether or not OS 325 is currently in the sleep state is stored in a predetermined area of storage unit 320.

Bus 330 is a portion where electrical signals transmitted and received by other components of information processing device 100 pass. Control signals and data are transmitted and received between each of the components of information processing device 100 via bus 330.

Communication unit 340 is controlled by processor 310 to perform an attempt to connect to networks 101, establishment of a connection, and breaking of a connection. Here, an attempt to connect means performing communication with a gateway specified for each of networks 101 via communication unit 340 in order to establish a connection to one of networks 101. Establishment of a connection means a state in which through the above-described attempt to connect, communication between a terminal located in networks 101 and information processing device 100 has become possible. Further, communication unit 340 detects a communication card or a network cable physically connected to information processing device 100 or detects a radio wave of WWAN or WLAN existing in space, thereby specifying a network to which information processing device 100 can connect. Communication unit 340 notifies processor 310 of a connectable network specified by information processing device 100.

Further, communication unit 340 may be single, or there may be a plurality of communication units for different types of network, including a communication unit for WWAN, a communication unit for WLAN, a communication unit for WiMAX, and a communication unit for wired LAN, for example.

The above-described components may constitute information processing device 100 in a physically independent state, or may constitute information processing device 100 with some components integrated. For example, functions of processor 310, storage unit 320, and communication unit 340 are partly or entirely integrated and mounted within a single LSI (Large Scale Integration).

In order to constitute each of the above-described components, other physically independent components may be combined. For example, in order to constitute logically single storage unit 320, a plurality of physically different storage units may be used.

Further, in order to distribute a load of processor 310, a plurality of processors or a microcomputer mounted within communication unit 340 or storage unit 320 may perform actual processing. In this exemplary embodiment, components performing these types of processing are collectively defined as processor 310.

[1-1-3. Configuration of Profile]

FIG. 4 is a diagram illustrating an example of a profile stored in storage unit 320 of information processing device 100 in the exemplary embodiment. Profile 400 is information in a database format. In profile 400, one or more sets of identification information 410 and associated priority order 420, environment setting information 430, program 441, and attribute information 442 are stored.

Identification information 410 is information specifying networks 101 to which information processing device 100 connects. Identification information 410 is information specifying the types of network such as a "WLAN," a "WiMAX," a "WWAN" and a "wired LAN." Identification information 410 is not limited to the above-described information that specifies the types of network. Identification information 410 may include an SSID (Service Set Identifier) that is an identifier of an access point in a wireless LAN, or information identifying a connection destination operator of WiMAX or WWAN. Alternatively, identification information 410 may be a name arbitrarily-given by a user to a specific network as desired. That is, identification information 410 may be any that specifies a connection destination.

Priority order 420 is information indicating an order according to which a connection to networks 101 is performed. For example, when information processing device 100 can connect to both a network A and a network B, processor 310 refers to priority order 420 to cause communication unit 340 to attempt to connect to a network higher in priority order 420. In this exemplary embodiment, the smaller a value in priority order 420, the higher a priority. Therefore, when information processing device 100 can connect to both the network A and the network B, processor 310 causes communication unit 340 to attempt to connect to network A. In this exemplary embodiment, processor 310 determines whether or not there is a connectable network at predetermined intervals, for example, in some seconds to some milliseconds. When there is a plurality of connectable networks, an attempt to connect to a network is performed according to priority order 420.

Further, priority order 420 may be omitted from profile 400. When there is a plurality of connectable networks, a connection destination may be determined by a method other than a priority order, for example, a connection is made to a network extracted first.

Environment setting information 430 is setting information when information processing device 100 connects to networks 101. In FIG. 4, environment setting information 430 is information on IP addresses of information processing device 100 set when information processing device 100 connects to networks 101. Environment setting information 430 in FIG. 4 indicates that when information processing device 100 connects to the network A, an IP address of information processing device 100 is obtained by a DHCP (Dynamic Host Configuration Protocol).

Further, in addition to information on IP addresses, environment setting information 430 may include information regarding various kinds of environments such as setting of a proxy, setting of a default printer, and setting of a homepage of a Web browser.

Program 441 is information indicating programs to be executed by processor 310 when information processing device 100 connects to networks 101. A program specified by program 441 is executed according to a start timing indicated by attribute information 442 to be described below. An example of a program written in program 441 includes an application such as an e-mail program, an editor, or a web browser.

Attribute information 442 is information indicating a timing at which a program specified by program 441 is executed. Attribute information 442 includes a setting "when sleep state is cleared," in which when information processing device 100 connects to one of networks 101 while OS 325 is in the sleep state, a program is not executed immediately after the connection, and when the sleep state is cleared, the program is executed, and a setting "immediately after connection," in which when information processing device 100 connects to one of networks 101, a program is executed immediately after the connection irrespective of whether or not OS 325 is in the sleep state. FIG. 4 shows that when information processing device 100 connects to the network A in the sleep state, the program A is executed when the sleep state is cleared since attribute information 442 is "when sleep state is cleared," while when information processing device 100 connects to the network B, the program B is executed immediately after the connection to the network B since attribute information 442 is "immediately after connection."

[1-2. Operation]

An operation of information processing device 100 configured as above will be described.

Figure 5:
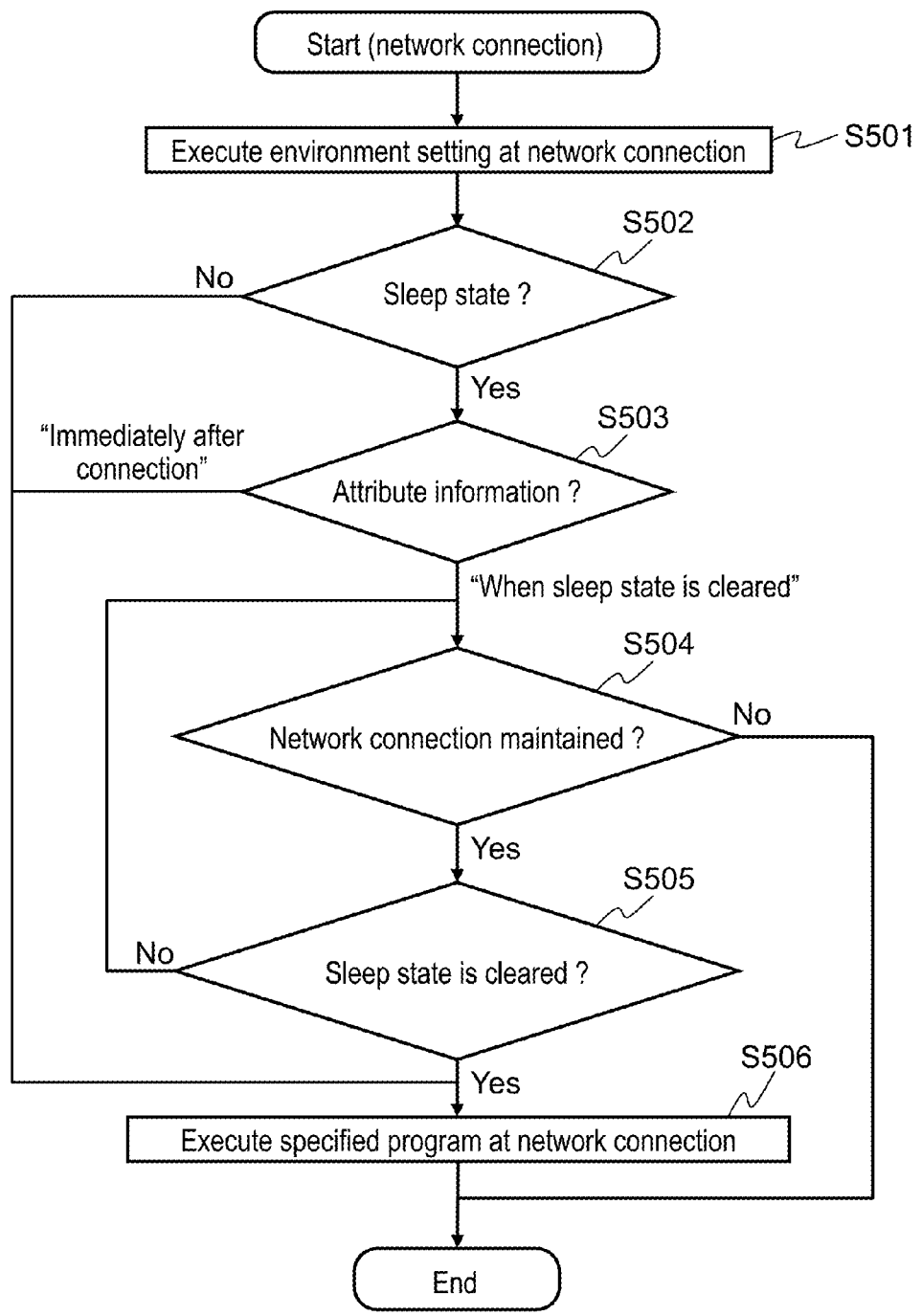
FIG. 5 is a flowchart illustrating an operation performed by the information processing device in the exemplary embodiment.

FIG. 5 is a flowchart illustrating an operation performed by information processing device 100 in the exemplary embodiment.

When information processing device 100 is connected to one of networks 101, processing is started according to the flowchart shown in FIG. 5. Processor 310 determines a timing at which a program specified in program 441 is executed, and executes the program at the determined timing.

(Step S501) Processor 310 refers to profile 400, and performs setting for connection to the one of networks 101 according to environment setting information 430.

(Step S502) Processor 310 checks whether or not OS 325 is in the sleep state. Information indicating whether or not OS 325 is in the sleep state is stored in a predetermined area of storage unit 320. When OS 325 is in the sleep state (when Yes), processor 310 proceeds to processing in step S503. When OS 325 is not in the sleep state (when No), processor 310 proceeds to processing in step S506.

(Step S503) Processor 310 refers to profile 400, and checks attribute information 442 associated with the one of networks 101 in connection. When attribute information 442 is "when sleep state is cleared," processor 310 proceeds to processing in step S504. When attribute information 442 is "immediately after connection," processor 310 proceeds to processing in step S506.

(Step S504) Processor 310 checks whether or not the connection to the one of networks 101 is maintained. When the connection is maintained (when Yes), processor 310 proceeds to processing in step S505. When the connection is not maintained (when No), the processing is terminated.

(Step S505) Processor 310 checks whether or not the sleep state of OS 325 is cleared. Whether or not OS 325 is in the sleep state is stored in the predetermined area of storage unit 320. When the sleep state is cleared (when Yes), processor 310 proceeds to processing in step S506. When the sleep state is not cleared (when No), processor 310 returns to the processing in step S504.

(Step S506) Processor 310 refers to profile 400, and executes the program specified in program 441 associated with the one of networks 101 in connection.

[1-3. Effects and the Like]

As described above, information processing device 100 in the present disclosure has communication unit 340, storage unit 320 in which OS 325 and programs are stored, and processor 310 that executes predetermined program 441 based on identification information on a predetermined network when communication unit 340 establishes a connection to the predetermined network. In a case where communication unit 340 establishes a connection to a predetermined network when information processing device 100 is in the sleep state, processor 310 does not execute predetermined program 441, and after the sleep state is cleared, processor 310 executes the predetermined program.

Generally, information processing device 100 such as a notebook PC automatically connects to an unspecified large number of networks even in the sleep state. When predetermined programs are executed one after another at every connection to the unspecified large number of networks, many programs can be left executed. In this exemplary embodiment, since execution of a predetermined program is not performed in the sleep state, and the predetermined program is executed only after the sleep state is cleared, a possibility that a number of executions of a predetermined program becomes enormous is reduced. That is, in this exemplary embodiment, execution of programs can be controlled appropriately, so that convenience of information processing device 100 can be enhanced.

Further, in information processing device 100 in this exemplary embodiment, storage unit 320 stores attribute information 442 in association with predetermined program 441. In a case where communication unit 340 establishes a connection to a predetermined network when information processing device 100 is in the sleep state, processor 310 determines whether or not to execute predetermined program 441, based on attribute information 442.

This allows a program specified by attribute information 442 to be executed even in the sleep state. Therefore, at every connection to the unspecified large number of networks, programs that have no problems when executed one after another can be executed even in the sleep state. Thus information processing device 100 can be further enhanced in convenience.

In this exemplary embodiment, attribute information 442 has been described as two types "when sleep state is cleared" and "immediately after connection," but attribute information 442 is not limited to these two types. For example, a timing of execution and a limitation on a number of executions may be added. For example, attribute information 442 may be information defining an upper limit of a number of executions of program 441. Specifically, information specifying "execute only once" may be written. When information defining an upper limit of a number of executions of program 441 is written in attribute information 442, in a case where communication unit 340 establishes a connection to a specific network in the sleep state due to the function of OS 325, processor 310 executes predetermined program 441 when the upper limit of the number of executions is not exceeded, based on attribute information 442. For a specific example, when "execute only once" is written in attribute information 442, processor 310 determines whether or not program 441 has already been executed in step S503, and then determines whether or not to execute program 441 or not. This can limit a number of starts of program 441 even when connections have been made to the unspecified large number of networks in the sleep state. Therefore, a possibility of an enormous number of executions of program 441 in the sleep state can be reduced, and thus convenience of information processing device 100 can be further enhanced.

In this exemplary embodiment, whether or not to execute a predetermined program depends on whether or not information processing device 100 is in the sleep state. Alternatively, whether or not to execute a predetermined program may depend on whether or not information processing device 100 is in a state before a user logs in OS 325, or in a system lock state in which a password entry is necessary in user action.

What is claimed is:

1. An information processing device, comprising:
   a communication unit;
   a storage unit in which an operating system, a program, and attribute information are stored; and
   a processor that executes a predetermined program based on identification information of a predetermined network when the communication unit establishes a connection to the predetermined network, wherein the attribute information is associated with the predetermined program, the attribute information including a timing at which the predetermined program is executed, the attribute information including when a sleep state is cleared and immediately after connection, and
   wherein in a case where the communication unit establishes a connection to the predetermined network when the information processing device is in a sleep state, the processor determines whether to executed the predetermined program based on the attribute information,
   when the attribute information indicates when the sleep state is cleared, the processor does not execute the predetermined program, and after the sleep state is cleared, in response to receiving an instruction from a user of the information processing device, the processor executes the predetermined program, and
   when the attribute information indicates immediately after connection, the processor immediately executes the predetermined program.

2. The information processing device according to claim 1, wherein
   the attribute information further includes when an upper limit of a number of executions is not exceeded, and
   in the case where the communication unit establishes the connection to the predetermined network when the information processing device is in the sleep state, the processor executes the predetermined program based on the attribute information when a number of executions of the predetermined program in the sleep state is less than the upper limit of the number of executions.

* * * * *